United States Patent [19]
Johns et al.

[11] Patent Number: 5,835,343
[45] Date of Patent: Nov. 10, 1998

[54] COMPUTER ASSEMBLY WITH HOUSING AND FRAME MEMBERS

[75] Inventors: H. Douglas Johns, Atlanta; Nicholas G. Forlenza, Marietta; Gregory K. Adams, Roswell; Jeffrey M. Reents, Atlanta; Michael C. Mayne, Conyers, all of Ga.; Carl R. Spoeth, Bayonet Point, Fla.

[73] Assignee: Monorail, Inc., Marietta, Ga.

[21] Appl. No.: 874,081

[22] Filed: Jun. 12, 1997

Related U.S. Application Data

[62] Division of Ser. No. 723,262, Sep. 30, 1996.

[51] Int. Cl.$^6$ .................................. G06F 1/16; H05K 7/02
[52] U.S. Cl. ............................................................ 361/681
[58] Field of Search ...................... 364/708.1; 312/223.2; 345/173, 905; 361/681, 683, 686, 732

[56] References Cited

U.S. PATENT DOCUMENTS

| | | |
|---|---|---|
| 140,312 | 6/1873 | Shephard . |
| 3,908,977 | 9/1975 | Roepke et al. . |
| 4,834,329 | 5/1989 | Delapp . |
| 5,046,693 | 9/1991 | Browne . |
| 5,100,098 | 3/1992 | Hawkins . |
| 5,179,447 | 1/1993 | Lain . |
| 5,264,992 | 11/1993 | Hogdahl et al. ........................ 361/681 |
| 5,566,050 | 10/1996 | Seto et al. ................................ 361/686 |
| 5,593,119 | 1/1997 | Moore et al. . |
| 5,677,830 | 10/1997 | Nogas et al. ......................... 361/732 X |

OTHER PUBLICATIONS

Pages printed from Compaq Computer Corporation's Website (http://www.compaq.com) related to the Compaq Presario 3000 Series, Aug. 13, 1996.

*Primary Examiner*—Michael W. Phillips
*Attorney, Agent, or Firm*—James L. Ewing; Geiff L. Sutcliffe; Kilpatrick Stockton LLP

[57] ABSTRACT

A computer includes a base unit and an upper unit having anterior and posterior housing members for enclosing all electronic components of the computer, such as an LCD display, system board, various drives, sound card, speakers, and modem. The base unit has dimensions of only about 11 inches by 7 inches and can easily be placed in small areas. Unlike a typical desk-top computer which has external cords or cables connecting the display to a main casing, the computer only requires a single power cable and a telephone cord and has a light weight which permits the computer to be easily transported to different locations. The upper unit can pivot relative to the base unit by simply pulling or pushing the upper unit with one hand to the desired angle and then releasing the upper unit. The base unit frictionally engages the upper unit to maintain the upper unit at the desired angle. The computer has a unique configuration in which input/output connectors of a typical motherboard are placed on a separate riser board positioned perpendicular to the system board. The system board in the computer, consequently, is substantially reduced in size thereby allowing a reduction in the computer's overall size.

8 Claims, 7 Drawing Sheets

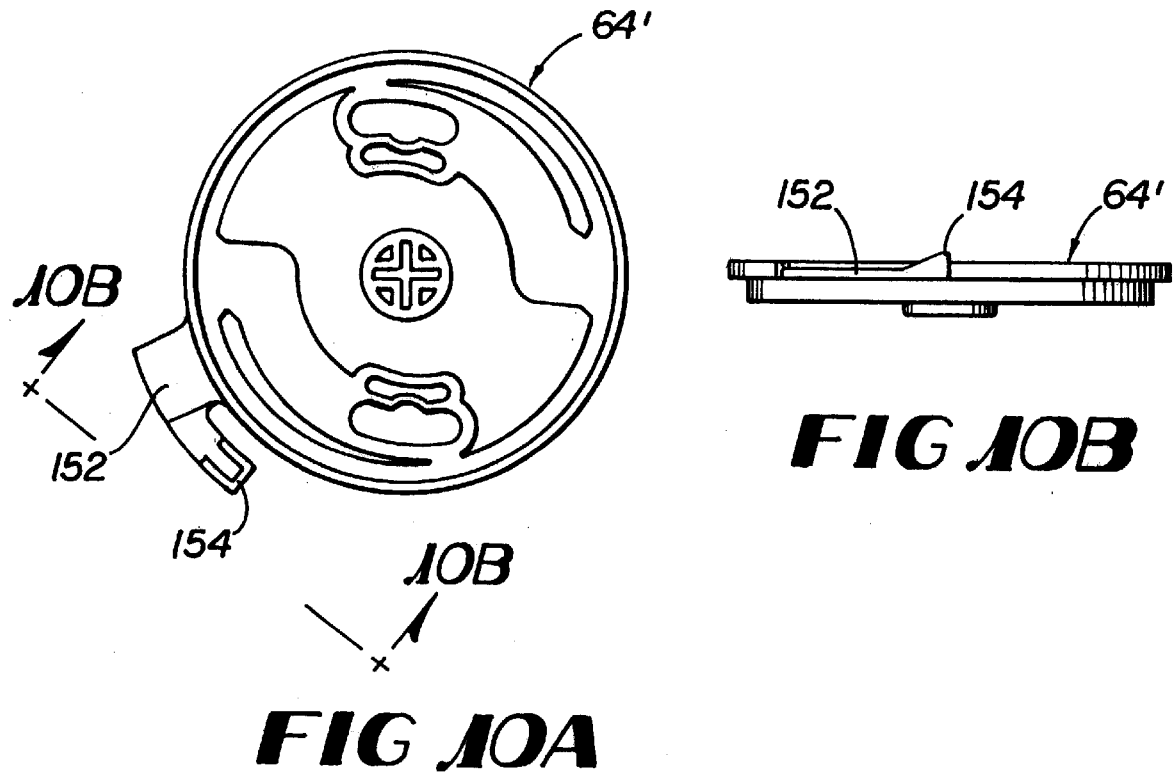
FIG 10A
FIG 10B
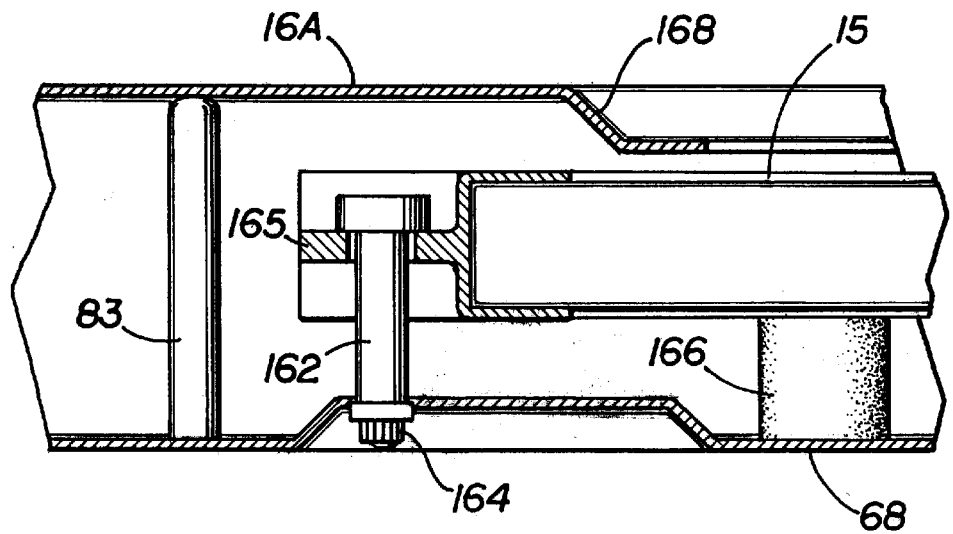
FIG 11

COMPUTER ASSEMBLY WITH HOUSING AND FRAME MEMBERS

This application is a divisional application of U.S. Ser. No. 08/723,262, filed on Sep. 30, 1996.

FIELD OF THE INVENTION

This invention relates to personal computers which are manufactured in modular fashion, which are adapted to accommodate new or updated components, which may be efficiently serviced and manufactured, which provide maximum functionality to the user for minimum cost, and which are particularly adapted for graphical inter-connectivity such as on the World Wide Web.

BACKGROUND OF THE INVENTION

Personal computers are rapidly becoming common household items and may eventually join the ranks of the television in prevalence. Recently, the advent of graphics on the Internet, via the World Wide Web, has popularized home computer use despite the relatively high cost of machines equipped to accommodate the large files, programs and presentation managers required for World Wide Web navigation and use. Falling prices and advances in technology have aided this trend, to be sure, but the relatively high price of an Internet class machine remains a dominant factor affecting home computer use. Although many middle to upper class households have computers, many middle and lower class households simply do not enjoy sufficient disposable income for a conventional Internet compatible computer. Other potential users divert their disposable income to other consumer electronics that usually sell in the $1000 range, such as video cameras, direct broadcast satellite stations, video disc equipment and similar items. Computers would be far more ubiquitous if they, too, could sell in this range, yet provide total access to the Internet and give the user complete Web functionality and compatibility.

The advances in technology in the computer industry have, in part, reduced the cost of computer components. Thus, the same computer which may not have been affordable several years ago may now be within the price range of certain households. Nevertheless, given Moore's law and similar trends, computers rapidly self-obsolesce as machines with faster, more advanced processors, larger memory and more recent software versions (which continually tax hardware requirements) enter the market. Therefore, even with the drop in prices due to advances in technology, a need exists for a computer which is not only more affordable but which is at, or at least close to, the state-of-the art in technology and which can be easily upgraded with market share devices and components.

In general, personal computers can be classified as either desk-top computers or notebook computers. The desk-top computer traditionally comprises a relatively large rectangular central processing unit (CPU) housing (hereinafter, for convenience, sometimes referred to simply as the "CPU") within which the motherboard, various drives, input/output devices and other components of the computer are housed. Typically, the CPU is placed on the surface of the desk, on another piece of furniture, or on the floor and a computer monitor is placed on top of the CPU or on the work surface. The desk-top computer additionally features a keyboard placed in front of the CPU, a mouse located at the front or side of the CPU, and often has a printer located on the desk or on another proximate piece of furniture.

The conventional desk-top computer is, however, relatively heavy and bulky, and has a large footprint. Many home desk-top work surfaces are spatially overwhelmed with a CPU, keyboard, mouse, and printer. Consequently, one or more of the components must be placed on the floor or on another piece of furniture. Yet the desk-top machine does offer superior graphics, a comfortable keyboard (as opposed to conventional notebooks) and a feel of permanence because it remains plugged into a telephone jack. Logging on the Internet from a home workstation of this sort requires far less effort than from a notebook in which the modem card must be plugged in and the user must contend with a compromised keyboard and a machine which tends to migrate around on the work surface, even it is does feature an independent mouse instead of the aesthetically and functionally inferior typical cursor or tracking device.

Desk-top computers are, however, difficult to move from one location to another. The desk-top computer has various external cables, including one for carrying signals from the CPU to the monitor, another for signals from the mouse to the CPU, a further for the signals from the keyboard to the CPU, as well as power cords for both the monitor and the CPU. Once these cords and cables have been connected to their respective components, the computer user is often reluctant to move the computer to a new location. In addition to the complexity of routing the cables and cords, the desk-top computer is also cumbersome to move due to its large size, multiple components, and considerable weight.

The second general class of personal computer, the notebook computer, overcomes many of the problems of the desk-top computer. The notebook computer is typically compact, lightweight, and portable so that it can be easily moved from one location to another location without having to reconnect a multitude of cables and cords. These advantages of the notebook computer versus the desk-top compute can unfortunately be obtained only with a great increase in cost and sacrifice in ease of service and ability to upgrade components. For instance, although both the notebook and desk-top computer may be equipped with comparable components, such as RAM, mouse, monitor, motherboard, hard drive, floppy drive, and CD ROM drive, the components designed for use in a notebook are considerably more expensive since they must be reduced in size in order to fit within the tight size constraints within the notebook. They also typically draw less power and enjoy less market share than comparable desktop components. The notebook computer also features unique costs such as those for a special battery and, because the casing is plastic, requires additional measures at an added cost in order to address electromagnetic interference (EMI) both inside and outside the notebook computer. The notebook computer, therefore, is often viewed as a luxury item and not as a computer for the average household.

In addition to its high price tag, the notebook computer has other disadvantages. For instance, the casing of the notebook is formed of a plastic material that often cracks or becomes marred after frequent use. Any cracks or marring of the notebook casing can not only detract from the appearance of the computer and pose a risk to the components inside but can also be disconcerting to an owner who just spent top-dollar for the convenience of the notebook computer and expects a high quality item in return.

A computer recently introduced into the market combines desk-top and notebook features and shares some of the advantages and disadvantages of both. This new computer, which is exemplified by the 3000 series Compaq Presario brand computer, has an LCD display mounted directly to a computer casing, thereby eliminating the cords and cables between the casing and monitor. The LCD display and casing unit are supported together on a single base which can be placed onto a desk surface. While the combination of the casing and LCD display would be smaller and would weigh less than the typical desk-top computer having its casing and a CRT monitor, the combination of the casing and LCD display still consumes a fairly large amount of space on a desk, is still rather large and heavy, and is typically more expensive than a comparably equipped desk-top computer. A further disadvantage with this type of computer is that the placement of the unit is fairly fixed. The casing is unable to pivot relative to the base and the LCD display only provides a fairly limited range of motion relative to the casing. A user may therefore find it difficult to adjust the display to his or her own optimal viewing angle.

Another problem facing all computers in general is that consumer confidence in previously owned computers is fairly low and, as a result, the market for previously owned computers is both small and rather unsophisticated. Even though computers are typically highly reliable and have a long product life, consumers have no objective way to gauge the degree to which a computer has been used and thus are generally reluctant to purchase used computers. With more objective evidence on the actual usage of computers, consumers might be more willing to purchase a used computer whereby a greater number of consumers would be able to enjoy the benefits of a computer.

A further difficulty with computers is that the design of any computer is based on estimates of actual usage and failure rates of the various components and elements forming the computer 10. The data on failures for the various components and elements is only available today through simulated life-testing performed in a test environment which does not reflect actual usage. As a result, the design of the computer may have aspects which are overdesigned to have a greater than necessary reliability, and hence greater cost, or to have a lesser than necessary reliability, and hence a larger than necessary failure rate.

As yet, a need exists for a computer which: (1) is relatively inexpensive, in the class of other consumer electronics; (2) is attractive, features a high quality display for World Wide Web operation and a comfortable keyboard and authentic mouse; (3) has the feel of permanence associated with desk top units but as of yet lacking in notebook units; (4) is easily serviced and supplied with new or upgraded components; (5) uses market share memory units, disk drives, hard drives and other desk-top type components rather than the more specialized, higher cost notebook components; (6) features a display which, even though integral to the CPU and positioned on a desk-top, may be oriented by the user left, right, up and down just as flexibly and easily as a notebook screen, (7) can enable one to objectively gauge the actual amount of usage; and (8) can enable one to determine the actual time of failure for a computer and to design the computer based on actual use conditions and failure rates.

SUMMARY OF THE INVENTION

Computers according to the present invention feature an upper unit and a base unit in which the upper unit houses not only the screen, but also the system board, drives, memory, input/output devices and other CPU-centric components and the base unit pivotally supports the upper unit. The base unit has at least one pivot which is attached to the upper unit and which defines a substantially horizontal pivot axis for the upper unit (in addition to the inherently vertical axis or axes which are a function of the base unit's placement on the workspace). In one version, a pair of substantially conical shaped plugs may be inserted at opposite ends of the base unit within a bore in the pivot. A pair of members are inserted at opposite ends of the base unit between the plugs and the pivots. By driving the plugs toward the ends of the base unit, the pair of members become compressed between the pivot and the plugs and provide a frictional force to the upper unit. This frictional force is ideally sufficiently small that a user may easily move the base unit to a desired viewing angle but large enough to maintain the base unit at the desired viewing angle once adjusted. The base unit preferably includes a stand for limiting a range of motion for the base unit and for providing additional support for the computer.

The invention, according to another aspect, relates to a computer that is uniquely configured within a housing on a plurality of separate support frames. In one embodiment, for instance, the computer has front and rear support frames and has a flat panel display mounted to an anterior side of the front frame. A system board, having components such as, for instance, a microprocessor, RAM, and a first connector, is mounted to the posterior side of the front frame and is interconnected to the flat panel display with conventional connectors such as cable. Storage devices and other components may be additionally mounted to the posterior of the front frame. The rear frame, on the other hand, may support other components such as, for instance, a disk drive, a power supply, and an input/output board. With this configuration of a computer supported on a plurality of frames, the computer components can coexist within a minimal amount of space, and they can be easily assembled, accessed, serviced, replaced with new components, or upgraded.

According to a further aspect, the invention relates to a cam assembly access device for use in a computer. The cam assembly includes a cam rotatably secured between a support frame and a lower housing. Components, such as a CD ROM drive and a floppy disk drive, are affixed to members which are then secured to the support frame by positioning clasping portions of the members within corresponding apertures in the support frame. The members are formed with followers which track camming surfaces in or on the cam when the members are secured to the support frame. When the clasping members are inserted completely into the apertures in the support frame, the components are disposed slightly from the housing of the computer, thereby permitting the placement of the housing over the components. By rotating the cam, the cam passageways force the followers on the members outwardly toward the housing, thereby closing any gaps between the housing and the components. With the cam assembly, the housing can be lowered past the components without damaging the face of the components and then the cam can be rotated to close the gaps between the components and the housing.

In yet a further aspect, the invention relates to a mounting assembly for placing a flat panel display in close proximity to a housing. The assembly includes the housing which has an aperture generally aligned with the flat panel display and a support frame mounted within the housing. A plurality of fasteners mounts the flat panel display to the support frame and a plurality of spring members, secured between the flat panel display and the support frame, bias the flat panel display toward the aperture in the housing. The fasteners are selected to have a length which prevents the flat panel display from contacting the housing. The spring members absorb pressures exerted on the flat panel display, thereby protecting the flat panel display from being damaged.

According to another facet of the invention, software, such as BIOS, implements a timer which tracks the total time the computer has been in use. When returned to the manufacturer on trade-in or for other reason, resale can be facilitated because potential users can be made aware of whether, for instance, the machine has been only used less than an hour and is thus practically new, or has been used for a significantly longer period and is therefore properly the subject of a reduced price. The software for tracking the life of the computer also provides a means to accurately track and resolve field failures. This results in a competitive advantage by allowing the computer design to be changed based on actual use conditions and allows a means to both increase the field reliability and to reduce costs in areas which are over-designed.

It is therefore an object of the present invention to provide a relatively inexpensive computer to compete with other electronics of its class.

It is another object of the invention to provide an attractive, inexpensive, modular, World Wide Web compatible computer having a high quality display, keyboard, and mouse.

It is a further object of the invention to provide a compact computer that has the feel of permanence associated with desk-top computers, but features a smaller footprint and cost.

It is yet another object of the invention to provide a modular computer that is easily serviced and supplied with new or upgraded components.

It is yet an additional object of the invention to provide a computer that has a low weight yet uses market share memory units, drives, and other components rather than higher cost notebook components.

It is yet a further object of the invention to provide a computer that has a display that can be easily oriented to a user's optimal viewing angle.

It is also an object of the invention to provide a computer that provides users or potential buyers with the capability of objectively gauging the extent to which the computer has been used.

Other objects, features, and advantages will become apparent with reference to the remainder of this document.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIGS. 10A and 10B are a top view and a side cross-sectional view, respectively, of a cam assembly according to a second embodiment of the invention;

FIG. 11 is an enlarged cross-sectional view of a preferred embodiment of a mounting assembly for an LCD display according to a preferred embodiment of the present invention.

DETAILED DESCRIPTION

Reference will now be made in detail to embodiments of the invention, including preferred embodiments of the invention, non-limiting examples of which are illustrated in the accompanying drawings. With reference to FIG. 1, a computer 10 according to a preferred embodiment of the invention comprises an upper unit 12 pivotally mounted on a base unit 14. In general, the upper unit 12 preferably, although not necessarily, integrates all of the components of a typical computer into a single enclosure while the base unit 14 provides a pivotal support for the upper unit 12.

Figure 6:
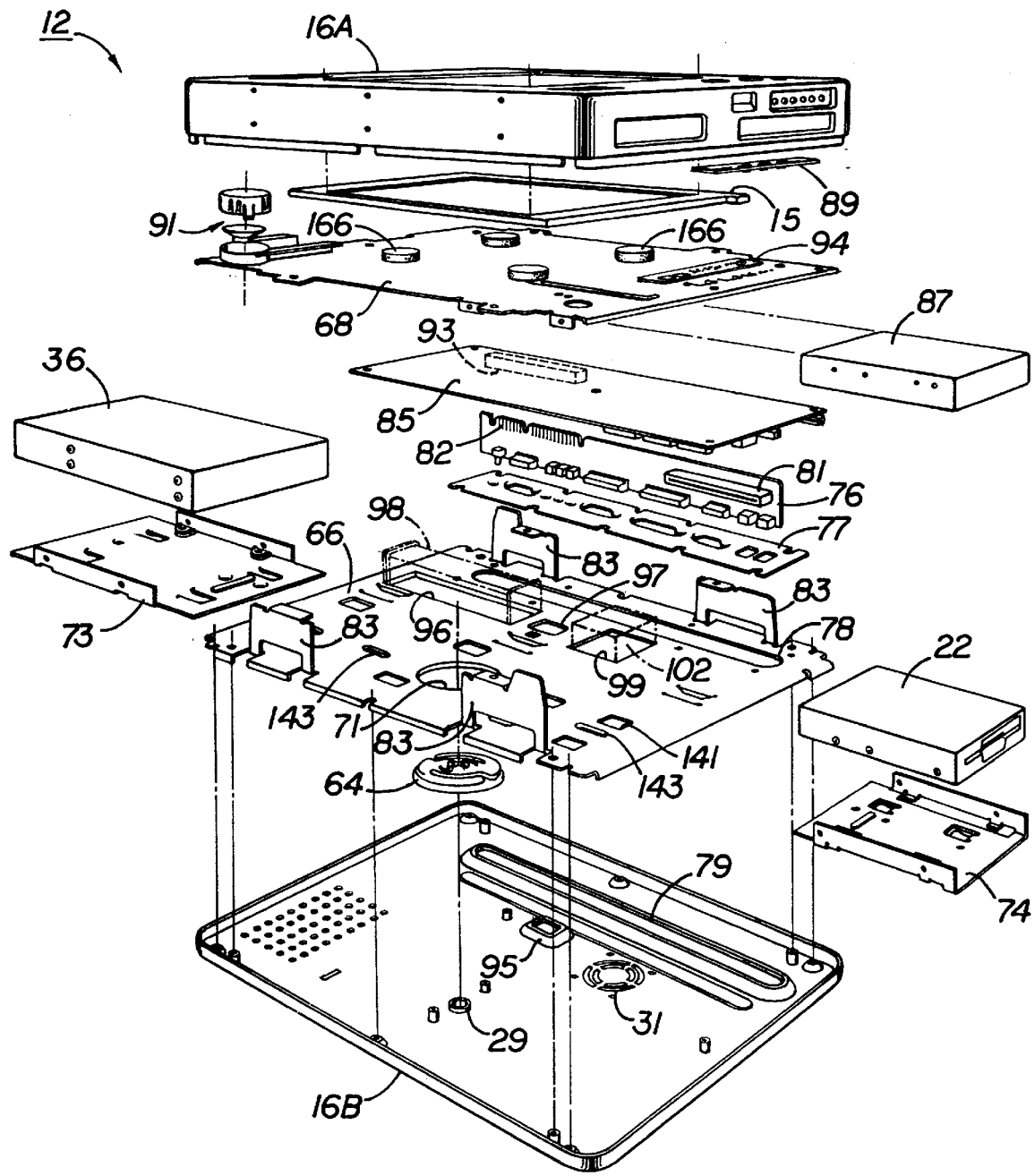
FIG. 6 is an exploded perspective view of an upper unit of the components of FIGS. 1A and 1B.

More specifically, the upper unit 12 as shown in FIG. 6 is comprised of an upper housing 16A and a lower housing 16B which are preferably formed of powder coated deep draw carbon steel. By forming the housing 16A and 16B of steel, the housing 16A and 16B, and thus the entire computer 10, is rather sturdy and provides a high degree of protection to the components within the upper unit 12. While the housing 16A and 16B may be formed of plastic or any other suitable material, the use of steel has advantages over plastic since the housing 16A and 16B can be more quickly and accurately stamped into the desired shape and can be produced at a lower cost. A steel housing 16A and 16B, as is described in more detail below, also provides a functional advantage over plastic in that it shields electromagnetic radiation.

The upper unit 12 may feature speakers (not shown) aligned with apertures 13, a liquid crystal display 15, a microphone (not shown) aligned with apertures 17, a standby switch 18, a volume switch 19, and a contrast switch 20. The LCD display 15 preferably comprises a Double-layer Super Twist Neumatic, display but may alternatively comprise any suitable type of flat panel display. The stand-by button 18 places the computer 10 in a stand-by or sleep-state and the volume switch 19 and contrast switch 20 provide hardware control over the volume of sound emanating from the speakers and the contrast of the display 15, respectively.

Figure 1A:
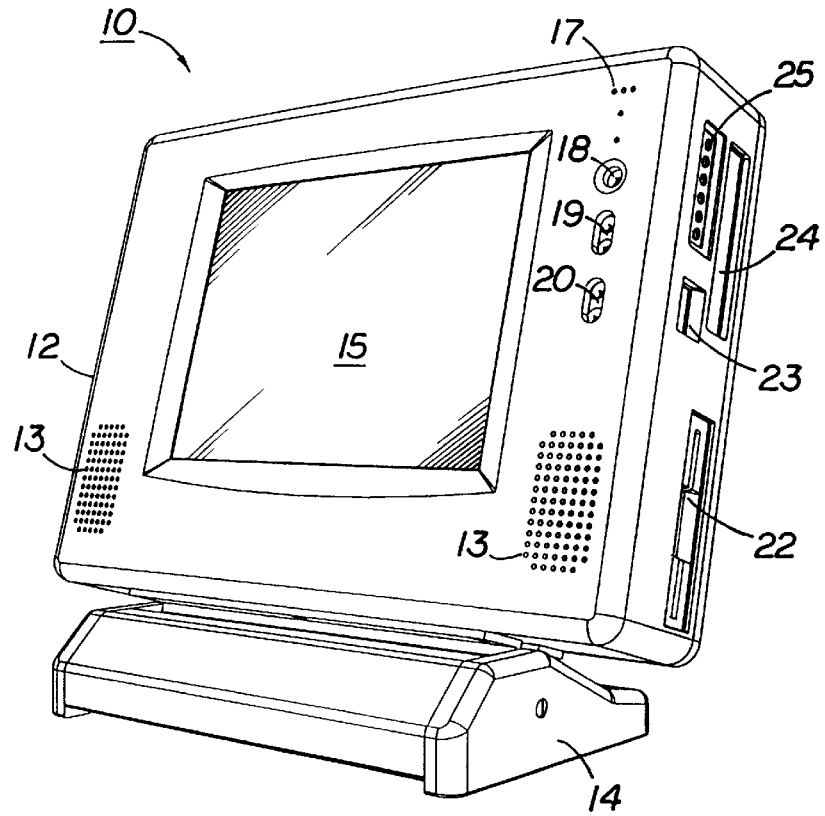
FIGS. 1A and 1B are front and rear perspective views, respectively, of a computer according to a preferred embodiment of the invention.
Figure 1B:
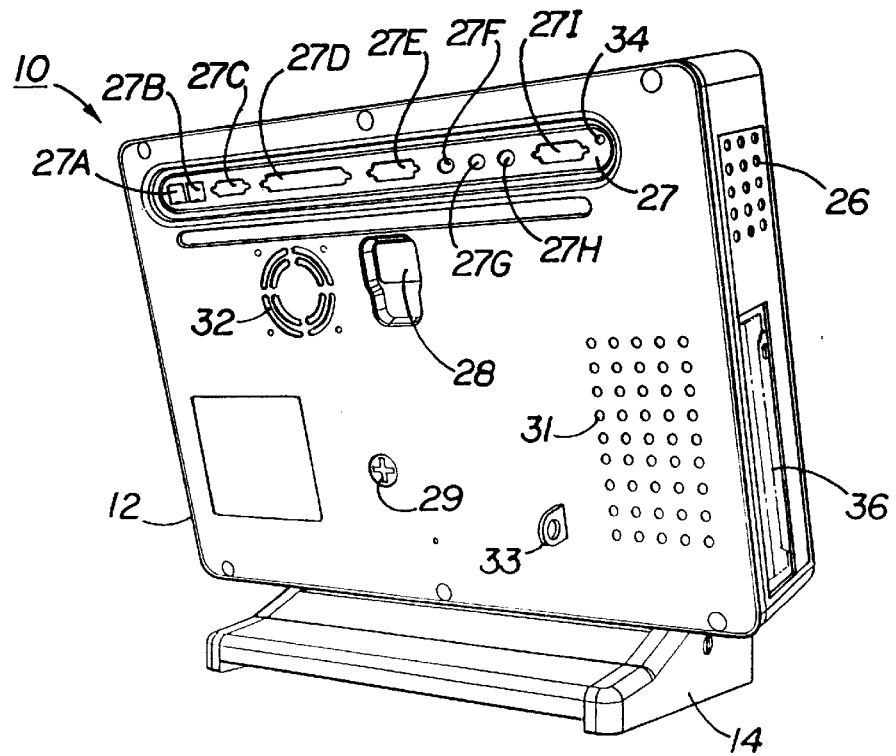

As shown in FIG. 1A, a 3.5 inch floppy drive 22, a modem port 23, and an expansion slot 24 may all be located on the right side of the upper unit 12. Optical or other drives, other mass memory, other input/output or other components may also easily be included as desired. The modem, if for Public Switched Telephone Network (PSTN), preferably has a baud rate of at least 33.6 Kbits/second but may instead operate at lower speeds. Cable modems, Integrated Services Digital Network (ISDN) modems, Asymmetrical Digital Subscriber Line (ADSL) modems, or any other synchronous or asynchronous communications device of any desired cost and bandwidth may be accommodated by the unit 12 at time of assembly or as the unit 12 is upgraded from time to time in the future. The expansion slot 24 allows the computer 10 to be updated to include additional components, such as network cards or other devices. As shown in FIG. 1B, a CD ROM drive 36 is located on the left side of the upper unit 12.

The rear of the upper unit 12, as shown in FIG. 1B, has a plurality of input/output ports 27, a drive lock port 29, ventilating apertures 31 and 32 in the lower housing 16B, and a lock-down member 33. The input/output ports 27 include a suitable mouse jack 27A, a keyboard jack 27B, a serial port 27C, a parallel port 27D, a joystick jack 27E, a microphone-in port 27F, an audio-out port 27G, an audio-in port 27H, and a VGA jack 27I Other ports may be included and supplied in the future via system board upgrades, component changes or upgrades, or as otherwise desired. The rear of the computer 10 may also have a reset button 34. A female outlet 28 aligned with an internal power supply is provided on the rear of the computer 10 for mating with a power cord. The apertures 31 provide an entry or exit path for ambient air while apertures 32 are aligned with a cooling fan and allow heated air to exit the computer 10. A drive lock port 29 provides access to a cam which, as will be described in more detail below, is used to install components such as, for instance, 3.5 inch floppy drive 22 and CD ROM drive 36. A lock-down member 33 can receive a cable for locking the computer 10 to a permanent fixture, such as a desk.

As should be apparent from FIGS. 1A and 1B, the upper unit 12 could, if desired (but need not) house all of the components of a conventional desk-top or lap-top computer. These elements include the display 15, the 3.5 inch floppy drive 22, and the CD ROM drive 36, as well as additional components which will be described in more detail below, such as a modem, system board, hard drive, RAM, video RAM, sound card, speakers, and an input/output board. All of these components, however, are provided within a compact volume defined between the upper and lower housings 16A and 16B. For instance, the overall size of the upper unit 12 of Figs. 1A and 1B is only slightly over 11 inches tall, 15 inches wide, and 3.5 inches in depth, which is significantly smaller than a conventional CPU portion of a desk-top or tower computer.

Figure 2:
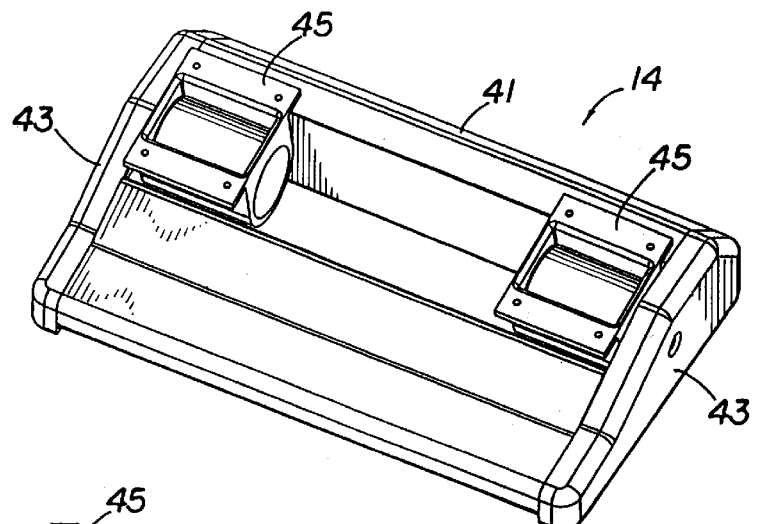
FIG. 2 is a top perspective view of a base unit of the computer of FIGS. 1A and 1B.
Figure 3:
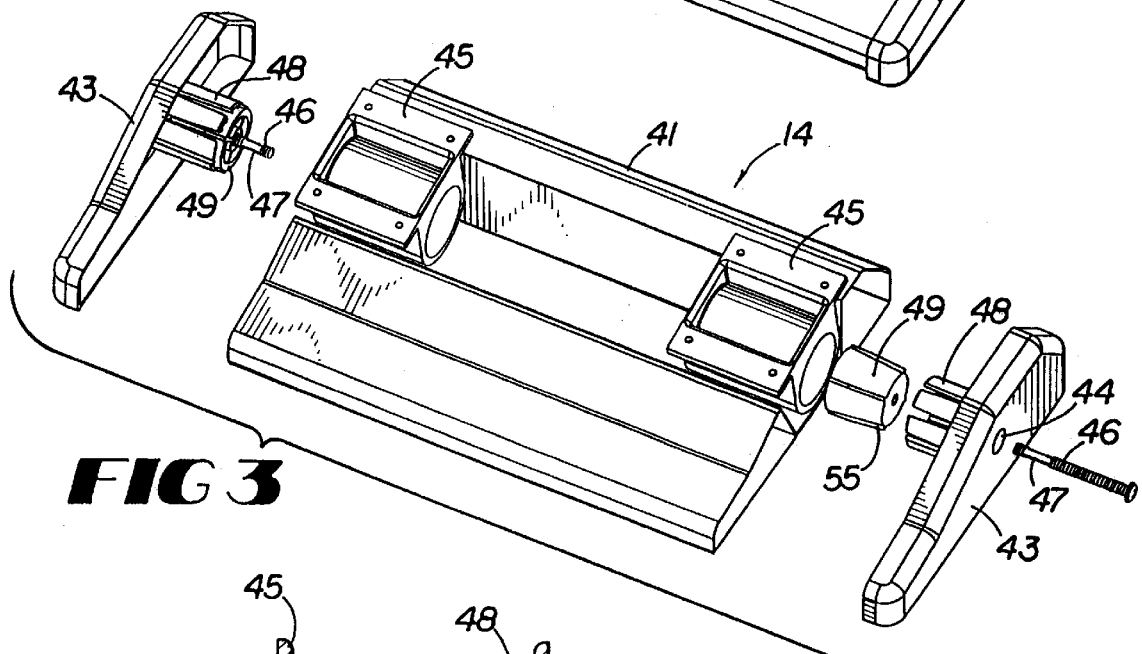
FIG. 3 is an exploded view of the base unit of FIG. 2.
Figure 4:
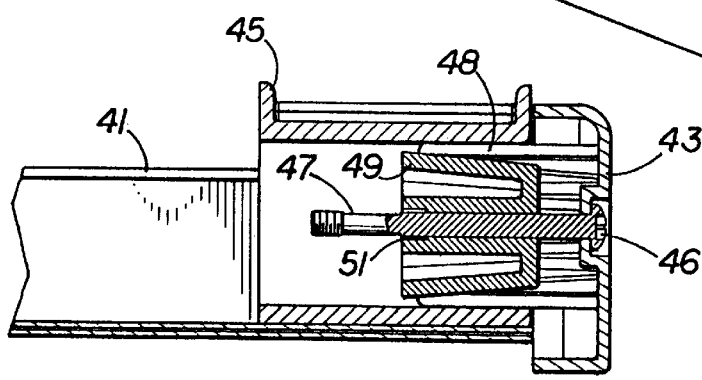
FIG. 4 is a partial cross-sectional front view of the base unit of FIG. 2.
Figure 5:
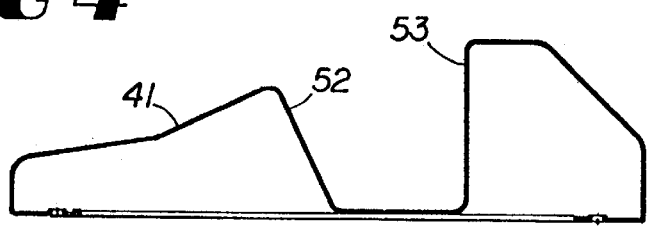
FIG. 5 is a side elevation view of a stand in the base unit of FIG. 2.

The base unit 14, shown in more detail in FIG. 2, comprises a stand 41, endcaps 43, and pivots 45. The pivots 45 are mounted to a bottom surface of the upper unit 12 and are secured to the endcaps 43. With reference to FIG. 3, the endcaps 43 have a plurality of circumferentially arranged projections 48 extending from an inner surface of the endcaps 43. A plug 49 with a generally conical shape and spaced ribs 55 has a threaded insert 51 for mating with threads on a bolt 46. Preferably, the endcaps 43 and plugs 49 are comprised of ABS polycarbonite, the pivots 45 are comprised of polypropylene, and the stand 41 is comprised of powder coated carbon steel. The base unit 14, however, may be formed from other materials, such as with nylon pivots 45.

To assemble the base unit 14, the pivots 45 are preferably mounted to the underside of the upper unit 12 with bolts or machine screws. The plugs 49 are inserted between the projecting members 48 with the ribs 55 of the plugs 49 positioned in the spaces between adjacent projecting members 48. The ribs 55 advantageously maintain the position of the plugs 49 relative to the members 48 and prevent the plugs 49 from rotating upon movement of the pivots 45. The bolts 46 are passed through apertures 44 in each of the endcaps 43 and are partially threaded through the plugs 49. The bolts 46 are preferably formed with a non-threaded portion 47 which renders the removal of the bolts 46 difficult once the bolts 46 have been threaded past this portion 47.

The bolts 46 are subsequently rotated, thereby driving the plugs 49 toward the endcaps 43 and, due to the conical shape of the plugs 49, forcing the projecting members 48 into frictional engagement with the pivot 45. Thus, by rotating the bolts 46, the endcaps 43 become frictional engaged with the pivots 45.

The stand 41 has a first surface 52 and a second surface 53 for limiting the extent to which the upper unit 12 can pivot relative to the base unit 14. In the preferred embodiment, the first surface 52 is formed at an angle of approximately sixty five degrees and the second surface 53 is formed at an angle of approximately ninety degrees whereby the upper unit 12 has a maximum pivot range of about twenty five degrees. This range is preferably reduced to about fifteen degrees by forming the pivots 45 so that they come in contact with the surface 52 at an angle of about seventy five degrees. The upper unit 12 is limited to this preferred range of motion to ensure that the computer 10 does not easily tip over but rather remains highly stable on a surface. It should be understood, however, that the computer can be manufactured to have a different range of motion, such as by forming the surfaces 52 and 53 at other angles or by forming ribbed surfaces on the pivots 45 to limit the range of motion. Also, while the stand 41 provides a large surface for supporting the upper unit 12 and for limiting the motion of the upper unit 12, the base unit 14 could alternatively be designed so that the endcaps 43, either in their present design or in a modified design, alone support the entire weight of computer 10 and also limit the motion of the upper unit 12. Further, while the base unit 14 has a pair of pivots 45, the base unit 14 could possibly be formed with just a single pivot.

In addition to limiting the range of motion for the upper unit 12, the base unit 14 also maintains the position of the upper unit 12 once it has been adjusted to a desired angle. Because the projecting members 48 are compressed between the plugs 49 and the pivots 45, the base unit 14 can provide a frictional force resisting any movement of the upper unit 12. This frictional force should be small enough so that a user can easily adjust the position of the upper unit 12 yet be great enough so that the upper unit 12 remains at the desired position.

A static frictional force, in general, is a vector function of $\mu\, F_{force}$, where $\mu$ is the coefficient of friction between two materials and $F_{force}$ is the magnitude of normal force generated by one of the two materials against the surface of the other material. In the base unit 14, $\mu$ represents the coefficient of friction between the pivot 45 and the projecting members 48 and $F_{force}$ is the magnitude of the normal force generated by the projecting members 48 against the pivots 45. The precise magnitude of the force $F_{force}$ between the projecting members 48 and pivots 45 can be independently controlled based on the extent to which the plugs 49 are withdrawn into the endcaps 43 which, in turn, may be accurately controlled by an application of a certain amount of torque to the bolts 46. An optimal amount of static frictional force associated with retaining a pivot position of the upper unit 12 relative to the base unit 14 can therefore be determined experimentally and, once determined, can be accurately and repeatedly applied to other base units 14 in mass production of the computer 10. Similarly, angles, dimensions, surface areas and forces may be adjusted conveniently in order to render a suitable kinetic frictional opposition to movement of the upper unit, so as to allow it to be easily repositioned, but not feel flimsy.

The stand 14, in contrast to a typical desk-top computer, is relatively small and consequently consumes a minimal amount of space on a desk. For instance, in the preferred embodiment, the base unit 14 has a foot print of only about 11 inches by 7 inches, which is about one-fourth the surface area of a conventional desk-top computer. As a result, the computer 10 can be more easily placed onto a surface, such as desk, along with a keyboard, mouse, and printer.

The base unit 14 according to the preferred embodiment of the invention, also allows the upper unit 12 to be easily adjusted to a desired viewing angle. A user need not worry about picking the computer 10 up in order to adjust the viewing angle nor worry about any complicated release latch but instead may simply place one hand on the upper unit 12 and either pull or push the unit 12 to the desired viewing angle. Additionally, once the upper unit 12 has been adjusted to the desired viewing angle, the base unit 14 automatically maintains the upper unit 12 at this desired angle by generating a suitable amount of frictional force at the pivots 45.

An exploded view of the upper unit 12 is shown in FIG. 6. The upper unit 12 includes a rear or posterior support frame 66 and a front or anterior support frame 68 upon which virtually all of the electronic components of the computer 10 are mounted. The rear support frame 66 is mounted to the lower housing 16B and a drive lock cam 64 is placed between the rear support frame 66 and the lower housing 16B. The drive lock cam 64 is positioned over the cam port 29 in the housing 16B, is centered within an aperture 71 in the rear support frame 66, and is freely rotatable. The CD ROM drive 36 and the 3.5 inch floppy drive 22 are mounted to moveable drive or plate members 73 and 74, respectively, which are then secured to the lower housing 16B. A riser board 76 holding the various input/output ports 27 is mounted to a plate 77 which is affixed to the rear support frame 66. The plate 77 and the rear support frame 66 both have oval-shaped apertures 78 and 79, respectively, so that the input/output ports 27 may be accessed from the rear of the computer 10. The riser board 76 also has a connector 81 for an auxiliary device, such as a network card or any ISA device, and a connector 82, which is preferably formed with gold fingers, for mating with a connector 93 on a system board 85. A power supply 98 is mounted in a recessed portion 96 of the rear support frame 66 and a power supply 102 is mounted within aperture 99 of the rear support frame 66.

The front support frame 68 secures all of the other electronic components in the computer 10. The system board 85, which contains a microprocessor, RAM, and ROM, is secured to the underside of the support frame 68. In the preferred embodiment, the system board 85 comprises at least a 586 microprocessor operating at 75 MHz, 16 Megabytes of RAM, ½ megabyte of video RAM, 256 kilobytes of cache memory, 16 bit sound, and a 33.6 Kbits/second modem. The system board 85 has the connector 93 for mating with the gold fingers 82 on the riser board 76. A hard drive 87 is also mounted to the underside of the front support frame 68 and preferably has 1.2 Gigabytes of storage capacity. The LCD display 15, on the other hand, is mounted to an anterior surface of the front support frame 68. Additionally, a set of speakers 91, only one of which is shown, an inverter board 89, and a circuit board 94 for mounting tactile switches for the stand-by switch 18, volume switch 19, and contrast switch 20 which are plastic actuators, are mounted to the anterior surface of the front support frame 68.

At a next step of assembly, the front support frame 68 is secured to the rear support frame 66. As shown in FIG. 6, the rear support frame 66 has a plurality of perpendicularly extending support members 83 upon which the front support frame 68 is affixed. Initially, the front support frame 68 may rest upon the support members 83 at the lower end of the upper unit 12 while cables are appropriately routed and interconnected between the various components in the computer 10. The front support frame 68 may then be lowered onto the other support members 83 and, at the same time, join connector 93 on the system board 85 with the gold fingers 82 on the riser board 76. With this connection, the microcomputer on the system board 85 becomes joined with the various connectors 27 on the riser board 76. Once the front support frame 68 has been coupled to the rear support frame 66, the upper housing 16A may be affixed to the lower housing 16B.

To simplify the description of the invention, FIG. 6 does not illustrate all components or elements within the computer 10 but rather is a partial view of the major components within the upper unit 12. While not shown, it should be understood that the upper unit 12 also includes numerous cables, such as data cables for interconnecting the system board 85 to each of the drives 22, 36, and 87, an audio cable for interconnecting the system board 85 to the CD ROM drive 36, as well as tie-down elements for securing the cables at desired positions within the upper unit 12. The computer 10 further includes conductors connecting the female plug 28 to the power supply 98, power cables running from the power supply 98 to each of the floppy drive 22, the CD ROM drive 36, and the system board 85, and a power cable running from the riser board 76 to a cooling fan 102.

One difficulty in installing the floppy drive 22 and the CD ROM drive 36 is in the placement of the drives 22 and 36 relative to the upper housing 16A. With conventional desktop computers, all of the drives are placed flush against the front of the casing and a major portion of the casing is removed by sliding the portion in a direction parallel with the length of the drives. The drives are preferably placed as close to the front of the casing as possible since any gaps detract from the overall appearance of the computer. With the computer 10, on the other hand, the upper housing 16A passes by the front edges of the drives 22 and 36 as the upper housing 16A is being lowered onto the lower housing 16B. To prevent the upper housing 16A from damaging buttons located on the front of the drives 22 and 36 as the upper housing 16A is being lowered, the drives 22 and 36 must be retracted slightly from the edges of the upper unit 12. The placement of the drives 22 and 36 at this retracted position, however, results in an unacceptable gap between the drives 22 and 36 and the upper housing 16A.

Figure 7A:
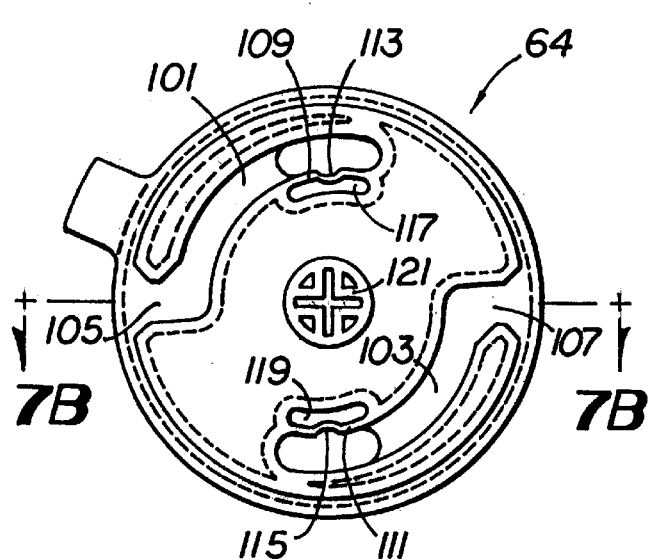
FIGS. 7A and 7B are a top view and a side cross-sectional view, respectively, of a preferred embodiment of a cam assembly according to the present invention.
Figure 7B:
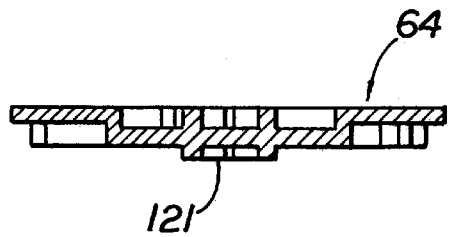
Figure 8A:
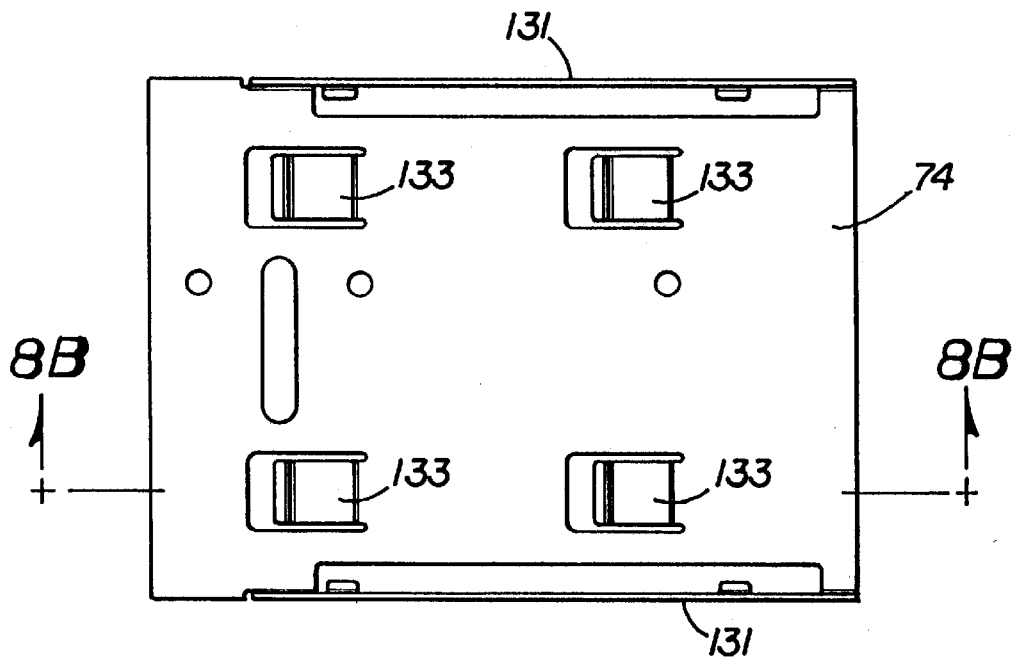
FIGS. 8A and 8B are top and side views, respectively, of a preferred embodiment of a mounting member according to the present invention which cooperates with the cam assembly of FIGS. 7A and 7B.

To overcome this difficulty, the computer 10 has a drive lock cam 64 which is used in conjunction with moveable members 73 and 74 to place the drives 22 and 36 at a retracted position while the upper housing 16A is mounted to the lower housing 16B and subsequently to reposition the drives 22 and 36 in close contact with the edges of the upper housing 16A. With reference to FIG. 7, the drive lock cam 64 includes cam passages 101 and 103 having openings 105 and 107, respectively. The cam passages 101 and 103 have spring portions 109 and 111, respectively, followed by locking portions 117 and 119, respectively. The drive lock cam 64 has a center portion 121 formed with a keyed surface. The moveable drive plate member 74 for the floppy drive 22, as shown in detail in FIGS. 8A and 8B, has raised sides 131 which are affixed to the sides of the floppy drive 22. The drive plate member 74 also has a set of four clasping members 133 and a set of three guide members 135. The structure of the drive plate member 73 for the CD ROM drive 36 will be apparent from the description of the drive plate member 74 and accordingly has been omitted.

Figure 8B:
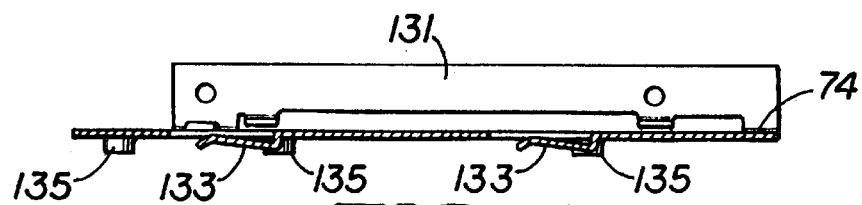

The operation of the drive lock cam 64 and drive members 73 and 74 will now be described with reference to FIGS. 9A to 9C. During the assembly of the computer 10, the floppy drive 22 is mounted to the drive plate member 73 and the CD ROM drive 36 is mounted to the drive plate member 73. Next, the members 73 and 74 are attached to the rear support frame 66 by inserting the clasping members 133 into holes 141 within the frame 66 and then sliding the members 73 and 74 toward the drive lock cam 64. When the members 73 and 74 are slid toward the cam 64, the clasping members 133 deflect downwardly and become positioned beneath the frame 66, thereby securing the members 73 and 74 and the drives 22 and 36 to the frame 66. As shown in FIG. 8B, the plate member 74 has guide members 135 depending from a lower surface of the plate member 74. As the plate member 74 is being attached to the rear support frame 66, the leading guide member 135, which may be considered a cam follower, enters a cam passageway 103 through an opening 107. The other guide members 135 travel within guide channels 143. Similarly, when the plate member 73 with CD ROM drive 36 is attached to the rear frame 66, a leading guide member on the plate member 73 enters cam passageway 101 through opening 105 and the other guide members travel within the guide channels 143. To more clearly illustrate the operation of the cam 64 and the drive members 73 and 74, the drives 22 and 36 have been omitted from FIGS. 9A to 9C.

Figure 9A:
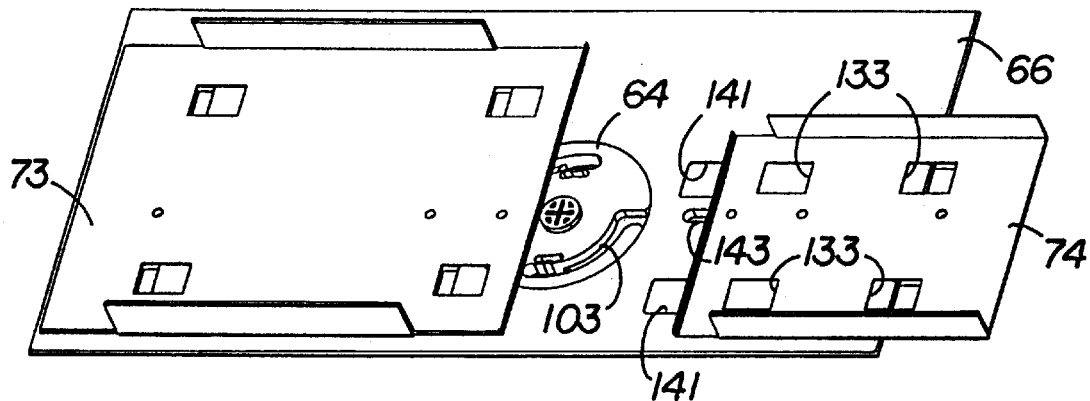
FIGS. 9A, 9B, and 9C are schematic perspective views of successive stages of the process of assembling drives in the upper unit using the cam assembly of FIGS. 7A and 7B and mounting members of FIGS. 8A and 8B.
Figure 9B:
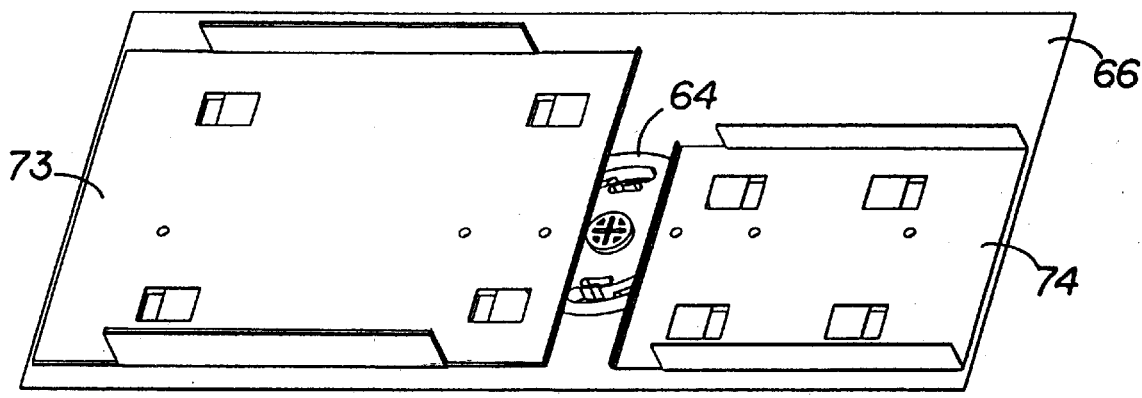
Figure 9C:
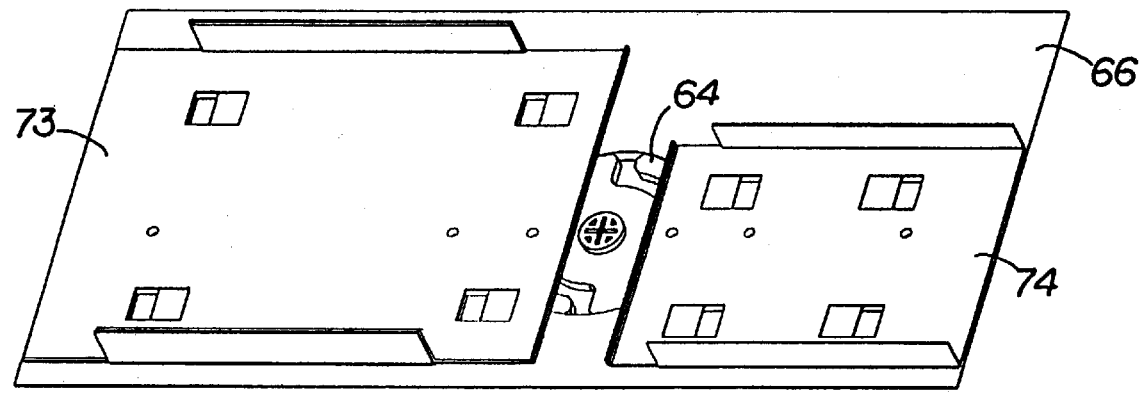

In FIG. 9A, the drive plate member 73 is depicted in its fully retracted position close to the cam 64 and the drive plate member 74 is depicted completely detached from the frame 66. In FIG. 9B, the drive plate member 74 is shown in its fully retracted position close to the cam 64, the leading guide member 135 on plate member 74 is positioned within cam passageway 103, and the leading guide member on plate member 73 is positioned within cam passageway 101. The drive members 73 and 74 remain at the positions shown in FIG. 9B during subsequent assembly steps, including the mounting of the upper housing 16A to the lower housing 16B. At these fully retracted positions shown in FIG. 9B, the upper housing 16A can be lowered and secured to the lower housing 16B without coming in contact with any buttons on the front edges of the drives 22 and 36 and can therefore be secured to the lower housing 16B without causing any damage to the drives 22 and 36. Once the upper housing 16A is secured to the lower housing 16B, however, a gap will exist between the drives 22 and 36.

To close the gap between the drive 22 and housing 16A and the gap between drive 36 and housing 16A, a tool having a shape mating with the keyed surface of the drive lock cam 64 is inserted into the drive lock port 29 to rotate the drive lock cam 64. While the tool may have a unique shape thereby discouraging any tampering by the user, the tool could simply comprise a conventional screw driver. Upon rotation of the cam 64, the leading guide members 135 of the members 73 and 74 travel in the cam passageways 101 and 103, respectively, and are biased outwardly to force the drives 22 and 36 into close contact with the upper housing 16A. The leading guide members 135 of the members 73 and 74 pass over spring portions 109 and 111, respectively, and are eventually locked into position within detents 113 and 115, respectively. Once the drives 22 and 36 are locked into position against the upper housing 16A, the drive lock port 29 is preferably sealed with a tamper evident tape so as to prevent the drives 22 and 36 from being retracted by the user of the computer 10.

With reference to FIGS. 10A and 10B, the computer 10 may use a cam 64' which has a cantilever arm 152 extending from a side surface of the cam 64'. The arm 152 has a raised portion 154 positioned at an end of the arm 152 for releasably locking the cam 64' in position. More precisely, in an initial position, the raised portion 154 of the arm 152 engages a lower surface of the rear support frame 66 and, as a result, is forced downwardly toward the lower housing 16A. When the cam 64' is completely rotated to force the CD ROM drive 36 and the floppy drive 22 against the upper housing 16A, the raised portion 154 of the cam 64' becomes aligned with an aperture in the rear support frame 66 and the raised portion 154 is free to protrude into this aperture. With the raised portion 154 in this aperture, further rotation of the cam 64' is resisted by the portion 154, whereby the drives 22 and 36 become locked in position flush against the upper housing 16A.

The LCD display 15 is preferably mounted flush against the upper housing 16A of the computer 10 in order to eliminate any gaps between the display 15 and the housing 16A. The placement of any display against a housing, however, subjects a front surface of the display to certain pressures. When pressure is applied to the front of an LCD display, the applied pressure produces brightness and distortion on the LCD display. Further, when the LCD display is vibrated, such as during shipping and handling, the vibrations can cause the front surface of the LCD display to become scratched thereby preventing images generated by the display from properly reaching the viewer. The placement of the display against the outer housing is also undesirable since a blow to the computer, such as from a drop of the computer, can transfer a significant force to the display and may cause severe damage to the display. It is thus rather difficult to place an LCD display close to an outer housing without resulting in some damage to the display or some loss in performance, such as bright spots or scratched surfaces.

The computer 10, on the other hand, mounts the LCD display 15 both close to the upper housing 16A and in a manner that protects the display 15 from being subjected to pressure. With reference to FIG. 11, the LCD display 15 has a mounting tab 165 that is affixed to the front frame 68 with a shoulder bolt 162 and a threaded insert 164. A spring member 166, which is preferably a silicon bumper but which may alternatively comprise a coil spring, leaf spring, or other type of spring, is placed between the LCD display 15 and the frame 68 to bias the mounting tab 165 of the LCD display 15 against the top of the shoulder bolt 162. At this upper position, the LCD display 15 is only about 0.020 of an inch from a bezel 168 in the upper housing 16A and, consequently, is mounted extremely close to the upper housing 16A with a nominal amount of spacing between the display 15 and the upper housing 16A. The shoulder bolt 162 prevents the LCD display 15 from contacting the upper housing 16A and therefore prevents the generation of scratched surfaces or bright spots on the LCD display 15. By spring mounting the LCD display 15 with the spring member 166, the LCD display 15 is advantageously able to absorb forces without causing damage to the display 15. Thus, the display 15 is mounted close to the upper housing 16A but is not subjected to any pressures which might cause damage to the display 15. While FIG. 6 only illustrates four spring members 166, it should be understood that the computer 10 may have a different number of spring members 166.

With the computer 10, the vast majority of the electronic components forming the computer 10 are disposed in the relatively small volume defined between the front and rear support frames 66 and 68. With this concentration of electronic components in a small volume, heat generated by the system board 85 and other electronic components must be removed from the computer 10. The cooling fan 102 and the microprocessor on the system board 85 are therefore preferably mounted in alignment with each other. With this arrangement, the fan 102 generates air turbulence at the processor and exchanges air within the computer 10 by generating a current of air. This current of air enters the computer 10 from ventilating apertures 32, to apertures 25 near floppy drive 22, and from apertures 26 near CD ROM drive 36 and exits the computer 10 through ventilating apertures 32. To maximize the cooling effect of this air current, all of the cables interconnecting the various components should be tied down so as to not interfere with the flow of air through the computer 10.

The upper unit 12 of the computer 10 has significant differences from both the conventional desk-top computer and the conventional lap-top computer. For instance, a motherboard in a conventional desk-top computer typically has dimensions of about 13 inches by 9 inches and incorporates the input/output connectors on the motherboard. The system board 85 according to the invention, in contrast, has dimensions of about 13 inches by only 5.4 inches and is thus substantially smaller than the typical motherboard. Further, the connectors 27 are not attached to the system board 85 but rather are placed on a separate riser board 76. Advantageously, this riser board 76 does not add to the overall length or width of the upper unit 12 but instead is disposed perpendicularly to the system board 85 and is interconnected to the system board 85 through a blind mate defined by connectors 82 and 93. The fabrication of a system board 85 having a modem and sound card and the fabrication of a riser board 76 is within the capability of one of ordinary skill in the art and accordingly will not be described in further detail.

Another significant difference with computer 10 is that the upper unit 12 is substantially smaller than the CPU casing for a typical desk-top computer. The upper unit 12 contains all electronic components of the computer 10 yet has dimensions of only slightly more than 13 inches by 15 inches by 3.5 inches. This is in contrast to the typically much larger dimensions of a conventional desk-top computer CPU casing. Further, while the conventional desk-top computer may consume an area on a desk of, perhaps, 16 inches by 21inches, the computer 10 according to the invention has the base unit 14 which consumes a surface area of only 9 inches by 6 inches. The computer 10 therefore has a substantially smaller footprint and can more easily be located and operated on small surfaces.

Moreover, the computer 10 according to the invention is at a significantly smaller weight than the conventional desk-top computer yet has a cost which is not only less than the lap-top computer but which is less than the conventional desktop computer. The computer 10, for instance, may have a weight of about 17 pounds and can therefore be easily transported from one location to another location. The computer 10, in contrast to notebook computers, does not rely upon expensive miniaturized hard drive, CD ROM drive 36, and other components to reduce the overall weight of the computer 10 but rather employs a novel housing 16A and 16B, support frames 66 and 68, and other features generally shown in FIG. 6 to obtain a reduced weight for the computer 10. Thus, without the more expensive notebook components, the weight can be reduced at a cost less than a comparably equipped notebook computer. The novel structure of the computer 10 and novel combination of components in the computer 10 further permit the computer 10 to be manufactured at a substantially reduced cost from a conventional desk-top computer. The computer 10 therefore has a smaller weight than the conventional desk-top computer and has a lower cost than either a comparably equipped notebook computer or desk-top computer.

The light weight of the computer 10 permits the computer 10 to share many of the advantages of the notebook computer. Unlike the desk-top computer, the computer 10 does not have any extraneous external cords or cables but instead has a single cord for supplying power to the computer 10 and may additionally have a telephone cord running to the modem. Without these extraneous cords and cables and due to its light weight, the computer 10 can therefore be transported fairly easily to different locations.

In contrast to the plastic casing of a notebook computer, the computer 10 has a metal housing 16A and 16B and is thus rather sturdy. Although not desired, the computer 10 can be accidentally dropped or hit with an object with minimal or no damage to the housing 16A and 16B. In contrast, substantial damage to the casing of a notebook computer often occurs if the notebook computer is dropped or if the computer is hit with an object. The spring-mounted LCD display 15 further insulates the LCD display 15 from becoming damaged upon impact. The housing 16A and 16B, in addition to being sturdy and rugged, also performs a beneficial function of shielding the computer 10 from external EMI and also for containing EMI generated from within the computer 10. The computer 10 advantageously obtains this EMI shielding without resort to additional costly measures employed by notebook computers.

Figure 12:
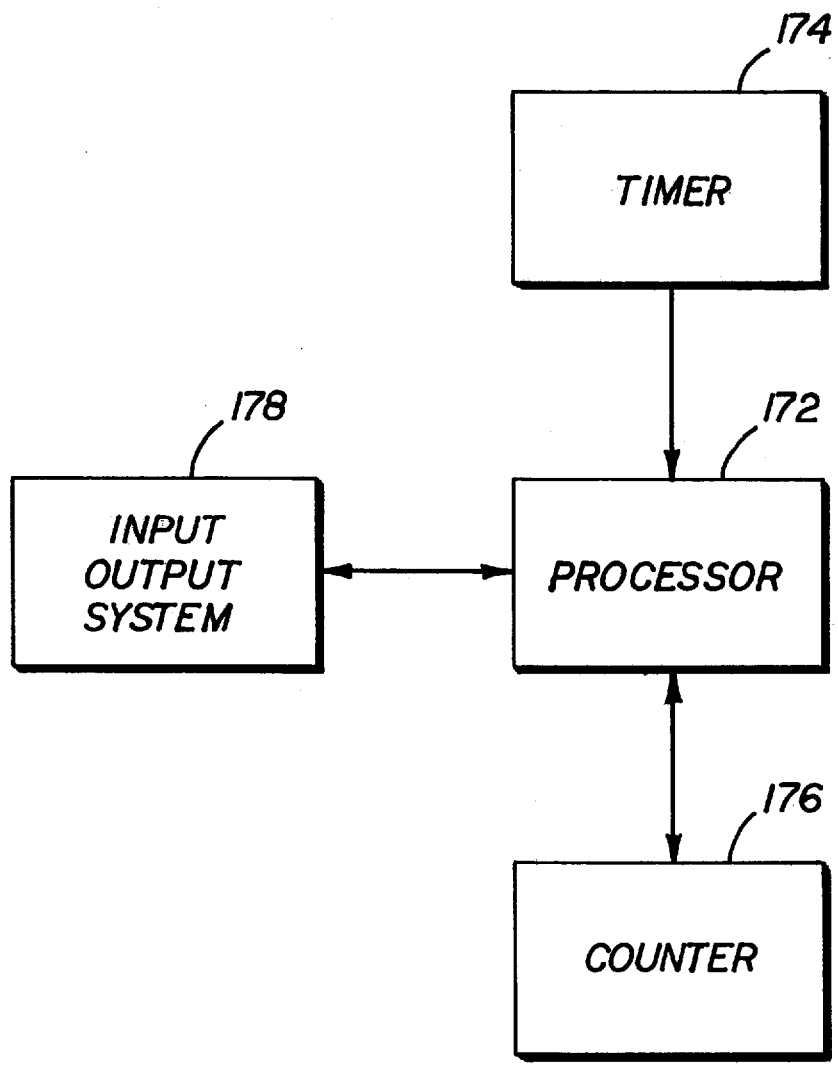
FIG. 12 is a functional block diagram of a timer according to a preferred embodiment of the present invention.

The computer 10 provides an additional feature of tracking the total amount of time that the computer 10 has been active. With reference to FIG. 12, a processor 172 on the system board 85 is connected to both a timer 174 and to a counter 176. At periodic intervals, the timer 174 interrupts the processor 172 to increment the total count stored in counter 176. Preferably, although not necessarily, the timer 174 is a hardware timer that provides a software interrupt to the processor 172. In order to preserve the total count after the computer 10 is turned off, the counter 176 preferably resides in non-volatile memory, such as in CMOS. The counter 176 is a sixteen bit counter with the first fifteen bits tracking the time of the computer up to 32,767 minutes, or 546 hours and 7 minutes, and the sixteenth bit being an overflow bit which is set when the total count exceeds 3FFh. Since the amount of fatigue on the various computer components during the time that the computer 10 is in a suspend or sleep state should be minimal, the counter 176 is incremented only during full-on time and not during the suspend time. The counter 176, if desired, could alternatively count the total on-time and could be comprised of a greater or lesser number of bits.

The count stored in counter 176 can also be read to determine the total amount of time that the computer 10 has been in a full-on state. The counter 176 is preferably read through a suitable Basic Input/Output Service (BIOS) call and can also be reset through a suitable BIOS call. Since one of ordinary skill in the art is capable of generating the suitable BIOS calls for reading and reading the count, the exact commands will not be described in full detail. Rather than BIOS calls, however, the count stored in counter 176 could instead be read through direct memory access. The life-time count may alternatively be realized in other ways than through the BIOS. For instance, a specialized ASIC may be designed to implement a timer and a counter. Also, a keyboard controller can be programmed to provide the timer and counter functions. The keyboard controller, which is typically found on most motherboards, has firmware which already is involved in power management and may therefore be easily modified to include the processor 172 and to track the life-time of the computer. Other ways of realizing the life-time counter will become apparent to those skilled in the art.

With the computer 10, the exact amount of time that the computer 10 has been in a full-on state can be easily and quickly read. With this total time, a consumer can more objectively assess the extent of fatigue on the various components and make a more educated decision as to whether the asking price for the computer is reasonable. The knowledge obtained by the count would also increase consumer confidence in the computer 10 since the consumer would not be taking a risk that the computer 10 has been used more often than that alleged.

The computer 10 also tracks and records actual data on failure rates. With this data, the computer designer need not estimate the failure rates of the various components or elements in the computer 10 but rather can rely upon actual real-life data. With this data, the cost of the computer 10 can be reduced by eliminating over-designed aspects. With the data, the computer 10 can also become more reliable since those components or elements which have a higher than expected failure rate can be redesigned. The data on actual failure times of the computer 10 is therefore quite useful for the computer designer.

The forgoing description of the preferred embodiment of the invention has been presented only for the purpose of illustration and description and is not intended to be exhaustive or to limit the invention to the precise form disclosed. Many modifications and variations are possible in light of the above teaching.

For example, the performance specifications on the various components within the computer 10 can be modified from that disclosed. Thus, the computer 10 is certainly not limited to a 586 microprocessor, an eight speed CD ROM drive 36, a 1.2 Gigabyte hard drive 87 but may be equipped with either higher quality or lower quality components, such as a 586 200 MHz processor. Also, although the placement of the various components within the computer 10 could be varied from that shown in the figures, the drives 22 and 36 are preferably placed near the bottom of the upper unit 12 to stabilize the computer 10. The cam assembly comprising the drive lock cam 64 and the members 73 and 74 may be used to mount other types of components, such as a photo-reader, flush with an outer surface of a computer housing. Further, the number and placement of guide members 135 on the members 73 and 74, the number, placement, and design of clasping members 133 on the members 73 and 74, and the number and placement of apertures 141 and 143 in the support frame 66 can all be varied from that disclosed.

The embodiment was chosen and described in-order to explain the principles of the invention and their practical application so as to enable others skilled in the art to utilize the invention and various embodiments and with various modifications as are suited to the particular use contemplated. It is intended that the scope of the invention only be limited by the claims appended hereto.

We claim:

1. A computer assembly, comprising:

a. an anterior housing member with a first orifice adapted to present a screen display;

b. a posterior housing member adapted to mate with the anterior housing member in order to form a posterior outside surface of said computer assembly;

c. an anterior frame member adapted to mount computer components;

d. a screen display positioned in registration with said first orifice in said anterior housing member and mounted on said anterior frame member; and e. a posterior frame member removably attached to said anterior frame member, removably attached to said posterior housing member, and oriented essentially parallel to said anterior frame member, said posterior housing member, and said screen display, said posterior frame member being adapted to mount additional computer components;

wherein at least one of said anterior housing member and said posterior housing member contains a second orifice.

2. The computer assembly as set forth in claim 1, wherein the screen display is mounted to a front surface of said anterior frame member and a system board, including a microprocessor and memory, is mounted to a rear surface of said anterior frame member.

3. The computer assembly as set forth in claim 2, further comprising a riser board positioned generally transverse to said anterior and posterior frame members, said riser board having a first connector and having a plurality of Input/Output ports being positioned in alignment with said second orifice, said first connector mating with a second connector on said system board to interconnect said Input/Output ports to said microprocessor and said second orifice being located on said posterior housing member.

4. in claim 1, wherein a first drive is mounted to said posterior frame member in alignment with the second orifice.

5. The computer assembly as set forth in claim 4, wherein a second drive is mounted to said posterior frame member on an opposite edge of said posterior frame member as said first drive.

6. The computer assembly as set forth in claim 5, wherein said second drive is mounted in alignment with a third orifice in one of said posterior or anterior housing members.

7. The computer assembly as set forth in claim 5, wherein said first drive comprises a floppy disk drive and said second drive comprises a CD ROM drive.

8. The computer assembly as set forth in claim 1, further comprising a power supply and a cooling fan mounted on said posterior frame member and wherein a system board is mounted to said anterior housing member, said cooling fan being aligned with a microprocessor on said system board.

\* \* \* \* \*